(No Model.)
A. M. CROOKER & R. WEINHOLD.
ANTIFRICTION DEVICE FOR AXLES.
No. 526,298. Patented Sept. 18, 1894.
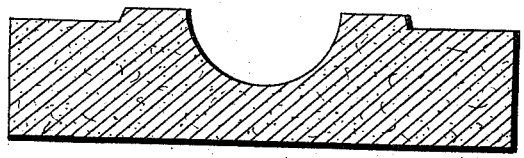
Witnesses.
Robert Everett,
G. W. Rea.
Inventors.
Alfred M. Crooker.
Richard Weinhold.
By
James L. Norris.
Atty.

UNITED STATES PATENT OFFICE.

ALFRED M. CROOKER AND RICHARD WEINHOLD, OF MEMPHIS, TENNESSEE, ASSIGNORS OF ONE-HALF TO JOSEPH W. MARTIN, OF SAME PLACE.

ANTIFRICTION DEVICE FOR AXLES.

SPECIFICATION forming part of Letters Patent No. 526,298, dated September 18, 1894.

Application filed February 8, 1894. Serial No. 499,520½. (No specimens.)

*To all whom it may concern:*

Be it known that we, ALFRED M. CROOKER and RICHARD WEINHOLD, citizens of the United States, residing at Memphis, in the county of Shelby and State of Tennessee, have invented certain new and useful Improvements in the Manufacture of Self-Lubricating Journal-Bearings, of which the following is a specification.
The object of our invention is to improve the manufacture of self-lubricating journal-bearings composed of fibrous material, plumbago, and oily substances; and to provide a product which possesses greater durability or wearing qualities than similar articles of the kind; and which is very useful and advantageous as an anti-friction bearing.

To accomplish this object our invention consists in the process or method of manufacturing self-lubricating journal-bearings, which consists in first compacting and shaping asbestos fiber into the form or shape desired, and subsequently saturating the compacted body with a mixture composed of paraffine and plumbago, as will hereinafter more fully appear.

The accompanying drawing shows a sectional view of a bearing made according to our invention, the form or shape of which will, however, be suited to the conditions required.

In carrying our invention into effect we take a mineral fiber composed of asbestos and solidly compact it into the shape of the bearing desired, and then saturate the compacted body of asbestos with a mixture or composition of matter composed of plumbago and paraffine.

In preparing the mixture or composition of matter, the paraffine is first melted or reduced to a fluid or liquid form by subjecting the same to heat, and then we thoroughly intermingle powdered or pulverized plumbago with the heated paraffine, and while the mixture or composition of matter is hot or heated, the solidly compacted body of asbestos is introduced thereinto and readily absorbs a sufficient quantity of the mixture or composition of matter to thoroughly and perfectly saturate the asbestos. This operation obviously heats the asbestos and makes it soft and flexible, and then this body of saturated asbestos is placed in a mold of the desired shape and subjected to great pressure. The pressure is continued in the mold until the compacted and molded body of saturated asbestos becomes cold, when it is ready for use as a self-lubricating bearing for journals, axles, and the like.

Our invention provides a very economical method of manufacturing a durable and efficient anti-friction bearing, which is susceptible of being practicably used without the subsequent application thereto of lubricating compounds or materials.

The improved bearing is not readily heated when in use as a bearing for a journal or axle; but if it should become heated the paraffine will flow and carry with it the plumbago to form a fresh coating on the surface of the compacted asbestos body to maintain a perfect self-lubricating bearing.

The fibrous foundation or base of asbestos is a non-conductor, and being inexpansible and incontractible it maintains an unvarying form, shape, or body when in use, and is not liable to disintegrate or otherwise become damaged by the constant rotation of the journal or axle in contact therewith.

It is well known that asbestos is in a large measure a lubricant when soft or fluffy, but when compacted or hardened it, in a large measure, is not advantageously used in a self-lubricating bearing. According to our method of manufacture, however, the asbestos fiber is first solidly compacted into the form desired, and is then thoroughly saturated in a hot or heated solution or mixture of paraffine and powdered or pulverized plumbago. The heated body of asbestos readily absorbs the fluid or liquid composition and becomes in a measure soft and flexible, so that it can then be molded under pressure into the form of bearing desired, and by permitting the bearing to become cold and solid under pressure a very superior article is produced, which possesses great durability or wearing qualities, and which will not disintegrate, and is very useful and advantageous as an anti-friction bearing.

The plumbago increases the efficiency of the asbestos fiber as a lubricating material, and the paraffine is a vehicle which carries or forces the plumbago thoroughly into the compacted asbestos fiber.

A bearing made according to our invention requires an excessively high temperature to heat it, and when cool it is very solid and compact, so that friction is in a very large measure reduced.

In the manufacture of a bearing of the character described it has been found that the asbestos fiber when compressed, no matter how hard it may be pressed, contains a certain quantity of air or air cells; but we have found that since the paraffine can be subjected to a very high temperature, it operates, when thoroughly mixed with the powdered or pulverized plumbago, to expel all the air from the compacted asbestos fiber, and the paraffine carries with it the plumbago into the air cells. When the air has been fully expelled, and the saturated body of asbestos has been molded, it is desirable to rapidly cool and harden it, so that the liquid will not flow out and air take its place. Therefore, we produce a very hard and solid bearing which possesses many advantages.

The plumbago produces a smooth lubricating surface, and as rapidly as it wears off and the bearing becomes heated, the paraffine flows and carries with it some of the plumbago to the surface of the bearing, thus forming a new coating or facing, and causing the journal or axle to become cool again. While this operation takes place, the solidly compacted body of asbestos retains its original form, and this result is due entirely to the fact that we solidly compact the asbestos fiber into the form desired before saturating it with the mixture of paraffine and powdered or pulverized plumbago.

We are aware that fiber has been mixed with plumbago, and then molded into form, and subsequently saturated with heated cotton-seed oil, but this does not constitute our invention, and is not claimed by us.

We do not wish to be understood as claiming simply a composition of matter, or a journal bearing composed of paraffine and asbestos fiber; but,

Having thus described our invention, what we claim is—

1. The process or method herein described of manufacturing a self-lubricating journal-bearing, which consists in first solidly compacting and shaping a body of asbestos fiber into the form desired, then saturating the compacted body with a heated mixture composed of paraffine and plumbago, and then molding the saturated body and cooling the same, substantially as set forth.

2. As an improved article of manufacture, a self-lubricating journal-bearing, consisting of a solidly compacted body of asbestos fiber saturated with a solution of paraffine and plumbago, substantially as and for the purpose described In testimony that we claim the foregoing we have hereunto set our hands this 27th day of January, 1894.

ALFRED M. CROOKER.
RICHARD WEINHOLD.

In presence of—
H. R. BOYD,
ED. McGEHEE.